Figure 1:
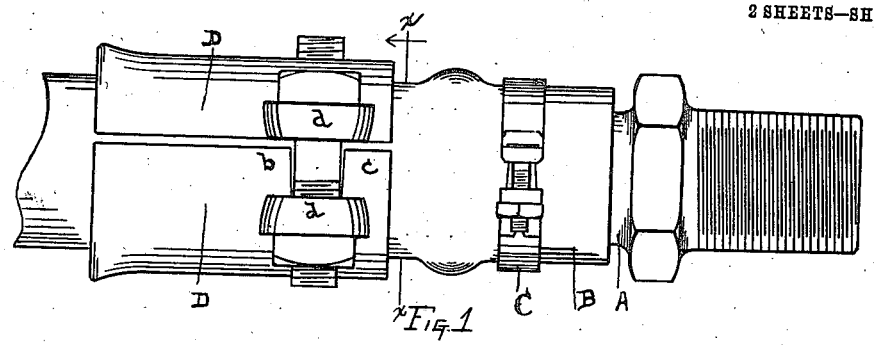

J. F. W. JOST, DEC'D.
E. C. JOST, ADMINISTRATRIX.
ATTACHMENT TO BE USED IN CONNECTION WITH HOSE COUPLINGS.
APPLICATION FILED JUNE 2, 1908.

953,422.

Patented Mar. 29, 1910.

2 SHEETS—SHEET 1.

WITNESSES:

INVENTOR

ATTORNEY.

J. F. W. JOST, DEC'D.
E. C. JOST, ADMINISTRATRIX.
ATTACHMENT TO BE USED IN CONNECTION WITH HOSE COUPLINGS.
APPLICATION FILED JUNE 2, 1908.
953,422.
Patented Mar. 29, 1910.
2 SHEETS—SHEET 2.
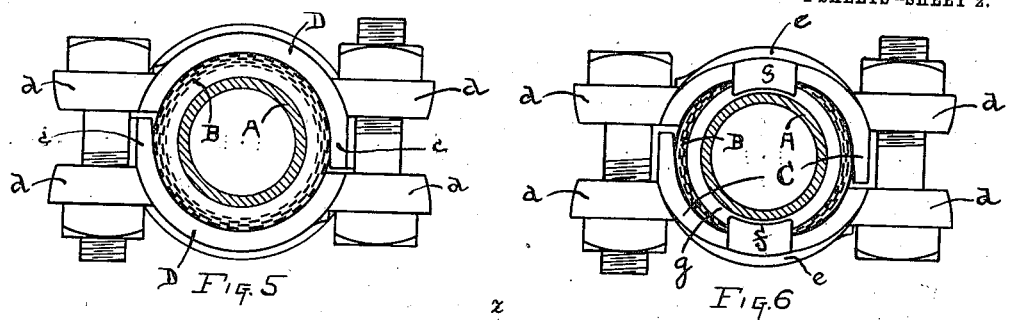
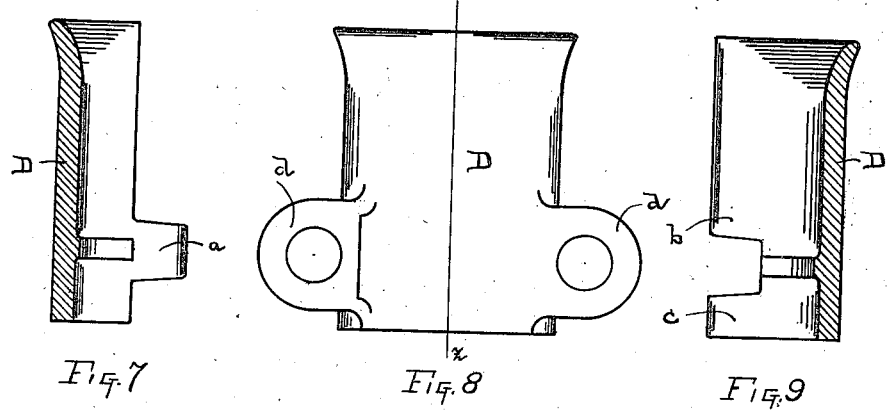
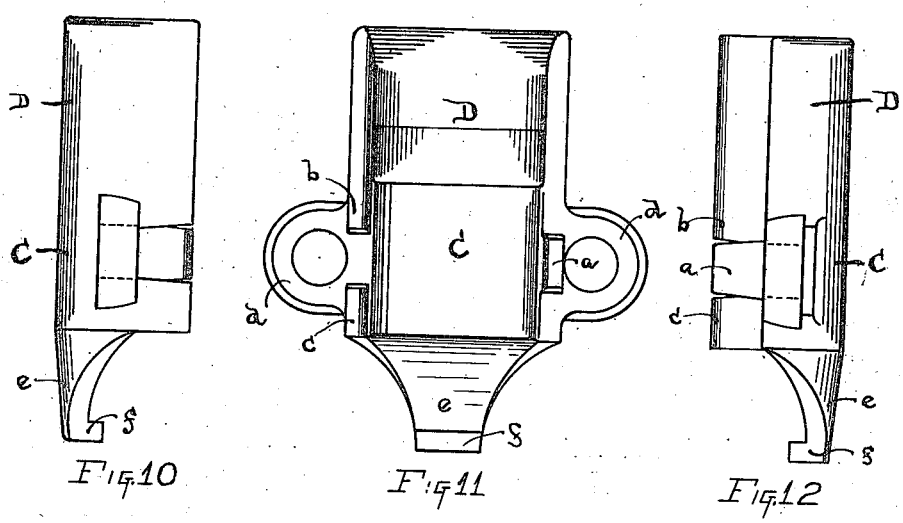
WITNESSES:
INVENTOR
John F. W. Jost, dec'd
BY
ATTORNEY.

UNITED STATES PATENT OFFICE.

ESTELLE CAPP JOST, OF PHILADELPHIA, PENNSYLVANIA, ADMINISTRATRIX OF JOHN FREDERICK W. JOST, DECEASED.

ATTACHMENT TO BE USED IN CONNECTION WITH HOSE-COUPLINGS.

953,422.   Specification of Letters Patent.   Patented Mar. 29, 1910.

Application filed June 2, 1908. Serial No. 436,298.

*To all whom it may concern:*

Be it known that JOHN FREDERICK W. JOST, deceased, late a citizen of the United States and resident of Philadelphia, in the county of Philadelphia and State of Pennsylvania, did invent certain new and useful Attachments to be Used in Connection with Hose-Couplers, of which the following is a specification.

The invention relates broadly to improvements in couplings or clamps for flexible hose or tube and more specifically to a device for preventing wear on the hose or tube by the metal parts.

When a flexible tube is connected with a non-flexible nipple, wear on the tube by the nipple causes the tube to deteriorate and shortens its life, and the object of the present invention is to obviate this.

In accomplishing this the invention consists in maintaining the tube rigid around the end of the nipple and for a short distance beyond the end of the nipple and in providing beyond the end of the nipple and outside of the hose a saddle over which the tube may bend without deterioration or cutting thereof.

The means of practicing the invention may be various in manner and form, and the device may be separate or integral with the clamp and the invention therefore is not limited to the construction shown, but there are illustrated two of these ways in the drawings which accompany this specification and are part of it, and in which—

Figure 2:
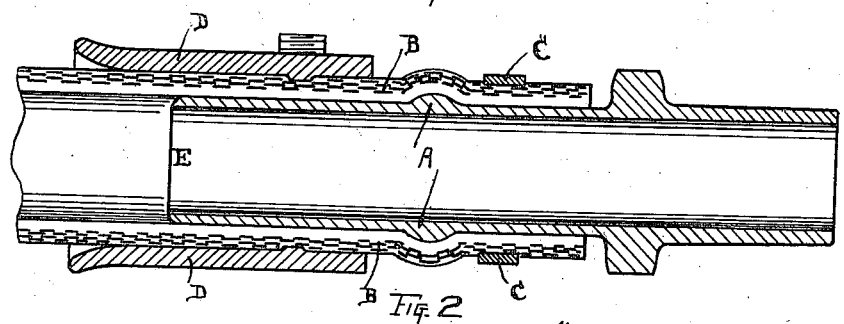
Figure 3:
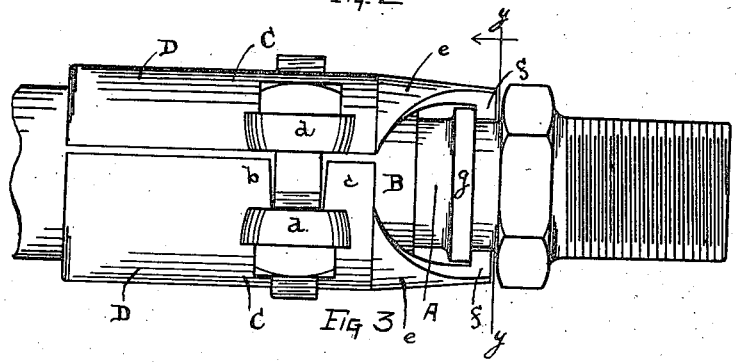
Figure 4:
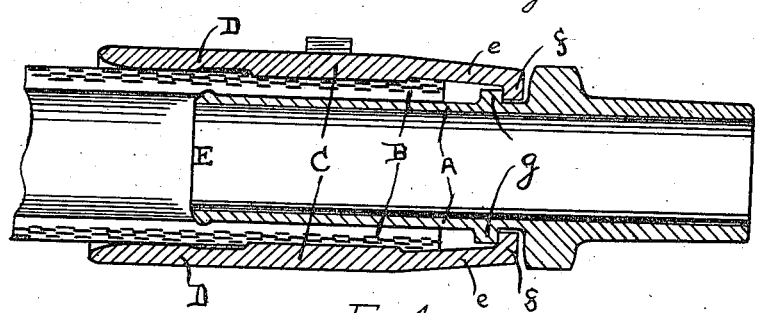

Figure 1, is a side elevation of a hose coupling provided with the invention and in which it is separate from the clamp securing the tube to the nipple. Fig. 2, is a midsectional view of the same. Fig. 3, is a side elevation of a hose coupling provided with the invention and in which it is integral with the hose clamp, the latter being of a different form than that shown in Fig. 1. Fig. 4, is a midsectional view of same. Fig. 5, is a cross sectional view of the invention as shown in Fig. 1, on the line *x x* looking in the direction of the arrow. Fig. 6, is a cross sectional view of the invention in connection with the clamp as shown in Fig. 3, on the line of *y y* looking in the direction of the arrow. Fig. 8, shows a top view of one of the integral halves of the invention as shown in elevation in Fig. 1, the clamping bolts being omitted. Figs. 7 and 9, are midsections of Fig. 8, on the line *z z* looking in their respective directions. Fig. 11, is an interior view of one of the integral halves of the clamp furnished with the invention as shown in elevation in Fig. 3. Figs. 10 and 12 are side views of same looking from their respective sides toward Fig. 11.

Similar letters refer to similar parts throughout the several views.

In Figs. 1 and 2, A, is a nipple having the mouth E, and B, is a hose or tube of flexible material; C is a clamp. On the outside of the tube surrounding the mouth of the nipple and extending far enough upon the nipple itself, to provide a seat for rigidity, there is a surrounding rigid ring D D of metal or other suitable material which extends however beyond the mouth of the nipple a suitable distance and at this end is provided with a rounded interior shoulder or when necessary a bell mouth, to prevent cutting of the tube and to form a saddle over which the tube may bend. The tube is thus held rigid at the mouth or end of the nipple and the rounded or belled end of the ring prevents wear; thus the tube is caused to bend not at the end of the nipple but beyond the end of the saddle and in the body of the tube, so that it is not impaired because the bending portion does not rub or contact with any part of the nipple.

In Figs. 3 and 4, A, is the nipple having the mouth E; B, is the hose or flexible tube and C C is the clamping ring with projecting arms *e e*, terminating in fingers *f f*, which engage a suitable shoulder *g*, formed on the nipple. Surrounding the mouth E, is an external bead that affords a rounded support for the hose. In this construction the surrounding ring constituting the invention is formed as an extension D D of the clamping ring C C which surrounds the mouth of the nipple and the extension D extends beyond the mouth and has its ends rounded or belled to prevent wear on the exterior of the hose.

One of the most convenient constructions of the rings and clamps with the rings, is to form them in halves, each side of the half having a complementary set of ears to the other as *a*, and *b, c*, shown best in Figs. 7, 9, and 11, and which register when a pair of these halves are placed in position around the tube. Bolts *d d*, are provided by which the halves are bolted together.

This construction is shown in Figs. 7 to 12, inclusive in which Figs. 7, 8 and 9, refer to the surrounding ring alone as shown in Figs. 1, 2, and 5, while Figs. 10, 11 and 12, refer to the combined ring and clamp as shown in Figs. 3, 4, and 6. In Fig. 4, it will be noted that the center portion of the parts D is of smaller internal diameter than the end portions, and the latter being of comparatively large diameter afford spaces at each end to accommodate the portion of the hose which swells by reason of the squeezing of the portion thereof clamped between the parts of the ring which are of comparatively small diameter.

The language and words herein used are not intended to limit the invention further than the prior state of the art may require, but

Having thus described the nature and object of the invention, what is claimed as new and desired to be secured by Letters Patent is—

1. In combination a hose, a smooth surfaced nipple inserted in the hose and having an external bead at its end for supporting the hose, and a clamp applied to the hose and nipple and having its middle portion opposite the bead of larger internal diameter than the end portions thereof which latter hugs the hose beyond the end of the nipple, substantially as described.

2. In combination a hose, a smooth surfaced nipple inserted in the hose and having an external bead at its end for supporting the hose, a clamp applied to the hose and nipple and having its middle portion opposite the bead of larger internal diameter than the end portions thereof which hugs the hose and terminates in a bell shaped mouth, substantially as described.

3. In combination a nipple having an integral shouldered shank and a two part clamp having integral fingers for engaging the shouldered portion of the shank and having their confronting surfaces parallel, a tube or hose interposed between said parallel surfaces, means for binding the clamp radially onto the hose or tube and nipple, and said clamp having integral portions thereof projecting beyond the mouth of the nipple and hugging the outside of the hose to support the portion of the hose beyond the nipple, whereby the bending and wearing point is transferred from the inside of the hose at the end of the nipple to the outside of the hose at the end of the projecting portion of the clamp.

In testimony whereof I have duly executed these presents in the presence of two subscribing witnesses.

JOHN FREDERICK W. JOST, Dec'd,
By ESTELLE CAPP JOST,
*Administratrix of estate of*
*John Frederick W. Jost, dec'd.*

Witnesses:
CLIFFORD K. CASSEL,
K. M. GILLIGAN.